US008341731B2

(12) United States Patent
Ueda

(10) Patent No.: US 8,341,731 B2
(45) Date of Patent: Dec. 25, 2012

(54) IC CARD AUTHENTICATION APPARATUS, IC CARD AUTHENTICATION METHOD, AND RECORDING MEDIUM HAVING IC CARD AUTHENTICATION PROGRAM RECORDED THEREON

(75) Inventor: Takashi Ueda, Kashiba (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 569 days.

(21) Appl. No.: 12/507,158

(22) Filed: Jul. 22, 2009

(65) Prior Publication Data

US 2010/0031350 A1 Feb. 4, 2010

(30) Foreign Application Priority Data

Jul. 29, 2008 (JP) ................................. 2008-195162

(51) Int. Cl.
*G06F 21/00* (2006.01)
(52) U.S. Cl. ........................ 726/20; 713/172; 713/185
(58) Field of Classification Search ............... 726/20; 705/75; 713/172, 185
See application file for complete search history.

(56) References Cited

U.S. PATENT DOCUMENTS 6,959,381 B2 * 10/2005 Wheeler et al. ............... 713/155

FOREIGN PATENT DOCUMENTS

| JP | 2002-032718 A | 1/2002 |
| JP | 2004-178331 A | 6/2004 |

OTHER PUBLICATIONS

JP2002032718 Machine Translation to English Published Jan. 31, 2002.*
Japanese Office Action issued in corresponding Japanese Patent Application No. 2008-195162, mailed Jun. 1, 2010, and an English translation thereof.

* cited by examiner

*Primary Examiner* — Gilberto Barron, Jr.
*Assistant Examiner* — Simon Kanaan
(74) *Attorney, Agent, or Firm* — Buchanan Ingersoll & Rooney PC

(57) ABSTRACT

An IC card is recognized by an IC card reader. Data is obtained from the recognized IC card. Card ID included in the obtained data is compared with card ID stored in a user registration information DB. If it is determined that the same card ID exists, an IC card issue count included in the obtained data is compared with an IC card issue count stored in the user registration information DB, and it is determined whether the counts are the same. If it is determined that the issue counts are not the same, a PIN code entry window appears so that the entered PIN code is compared with a PIN code in the user registration information DB. If it is determined that the PIN codes are the same, authentication success is displayed.

9 Claims, 7 Drawing Sheets

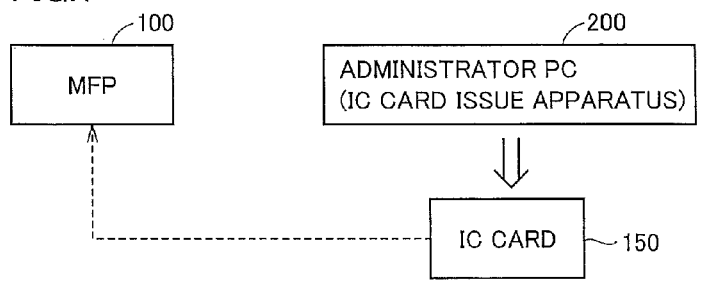
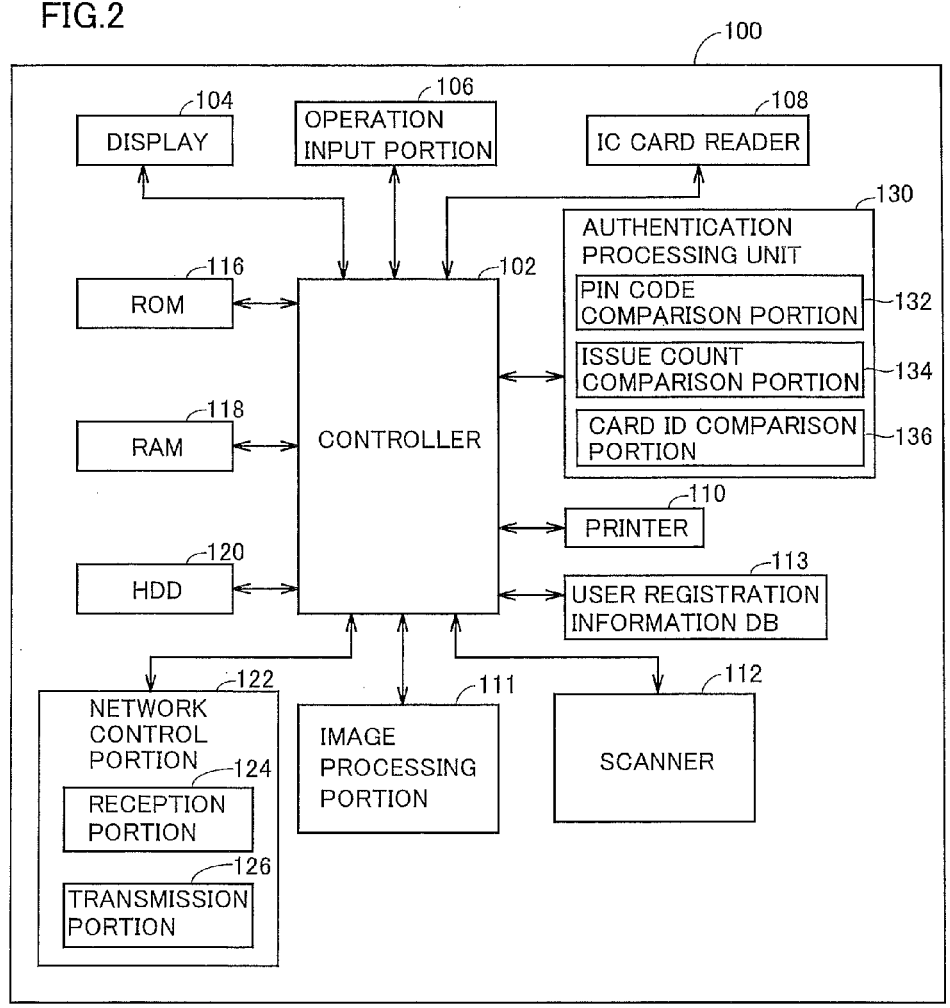

| CARD ID | : 12345678 |
| USER NAME | : Yamada Taro |
| ISSUE COUNT | : 1 |
| COMPANY NAME | : ABC TRADING COMPANY |
| DEPARTMENT | : ACCOUNTS DEPARTMENT |

FIG.7
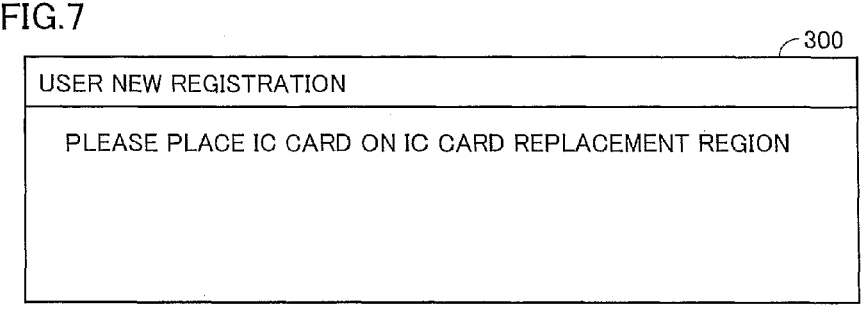
FIG.8
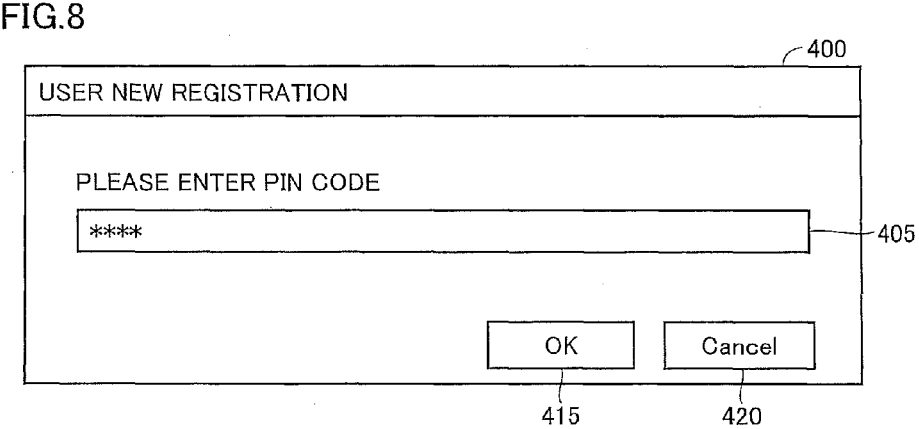
FIG.9
| No. | CARD ID | USER NAME | ISSUE COUNT | PIN CODE | COMPANY NAME | DEPARTMENT |
|---|---|---|---|---|---|---|
| 1 | 12345678 | Yamada Taro | 1 | 1234 | ABC TRADING COMPANY | ACCOUNTS DEPARTMENT |
| 2 | : | : | : | : | : | : |
| 3 | : | : | : | : | : | : |
| 4 | : | : | : | : | : | : |
| 5 | : | : | : | : | : | : |
| 6 | : | : | : | : | : | : |

IC CARD AUTHENTICATION APPARATUS, IC CARD AUTHENTICATION METHOD, AND RECORDING MEDIUM HAVING IC CARD AUTHENTICATION PROGRAM RECORDED THEREON

This application is based on Japanese Patent Application No. 2008-195162 filed with the Japan Patent Office on Jul. 29, 2008, the entire content of which is hereby incorporated by reference.

BACKGROUND OF THE INVENTION

1. Field of the Invention

The present invention relates to user authentication using an IC (Integrated Circuit) card having user authentication information stored therein, in an IC card authentication apparatus.

2. Description of the Related Art

Conventionally, user authentication using IC cards is performed, for example, in information processing apparatuses such as printers or MFP (Multi Function Peripheral).

For example, in order to improve operability, assuming that a user carrying an IC card is the owner of the IC card, user authentication may be completed as long as user authentication information such as card identification information stored in the IC card is matched.

On the other hand, in order to increase the security level, a user is prompted to input a PIN (Personal Identification Number) code (including a password) that is a personal identification number to identify whether or not the user carrying an IC card is the owner of the IC card, and user authentication may be completed when the PIN code is matched.

In general, users take charge of IC cards and are often authenticated only by matching user authentication information such as card identification information without inputting PIN codes, in favor of operability and convenience.

However, in the case where IC cards are lost by users and reissued, if the reissued IC cards are used with evil intent before coming into the possession of the users, user authentication is completed without PIN codes entry. This may lead to leakage of confidential information from information processing apparatuses.

According to the technique disclosed in Japanese Laid-Open Patent Publication No. 2004-178331, in the case where a user has lost his IC card and wishes reissue, when a reissue request for an IC card is received from the user, user authentication is performed. If the user is identified as the owner of the IC card, information of providing services to the user is recorded in the IC card.

However, the aforementioned patent document discloses an authentication process for IC cards issued by financial institutions giving top priority to security. When IC cards are reissued, the user authentication process is performed using a server in order to ensure security, thereby complicating the system.

SUMMARY OF THE INVENTION

The present invention is made to solve the problem as mentioned above. An object of the present invention is to provide an IC card authentication apparatus, an authentication information method, and a recording medium having an authentication information program recorded thereon, which allow the security level to be increased with a simple scheme in the case of reissue of IC cards.

An IC card authentication apparatus in accordance with the present invention includes: an IC card reader for reading information of an IC card having card identification information and an IC card issue count stored therein; a memory for storing user information including card identification information and a personal identification number and an IC card issue count associated with the card identification information; and a processing unit executing a user authentication process. The processing unit includes an user identification comparison portion for comparing the card identification information stored in the IC card read by the IC card reader with the card identification information of the user information stored in the memory, a card issue count comparison portion for comparing the IC card issue count stored in the IC card with the IC card issue count of the user information stored in the memory and having the matching card identification information, if the card identification information matches in the user identification comparison portion, and a personal identification number comparison portion for comparing a personal identification number input by a user with the personal identification number of the user information stored in the memory and having the matching card identification information, if the IC card issue counts do not match in the card issue count comparison portion.

An IC card authentication method in accordance with the present invention includes the steps of: storing user information including card identification information and a personal identification number and an IC card issue count associated with the card identification information into a memory; reading information of an IC card having card identification information and an IC card issue count stored therein; and executing a user authentication process. The step of executing a user authentication process includes the steps of: comparing the card identification information stored in the IC card with the card identification information of the user information stored in the memory; if the card identification information matches, comparing the IC card issue count stored in the IC card with the IC card issue count of the user information stored in the memory and having the matching card identification information; and, if the IC card issue counts indicate unmatch, comparing a personal identification number input by a user with the personal identification number of the user information stored in the memory and having the matching card identification information.

A recording medium in accordance with the present invention has an IC card authentication program stored therein to be executed by a computer including a memory storing user information including card identification information and a personal identification number and an IC card issue count associated with the card identification number. The IC card authentication program causes the computer to execute processing including the steps of: reading information of an IC card having card identification information and an IC card issue count stored therein; and executing a user authentication process. The step of executing a user authentication process includes the steps of: comparing the card identification information stored in the IC card with the card identification information of the user information stored in the memory; if the card identification information matches, comparing the IC card issue count stored in the IC card with the IC card issue count of the user information stored in the memory and having the matching card identification information; and, if the IC card issue counts indicate unmatch, comparing a personal identification number input by a user with the personal identification number of the user information stored in the memory and having the matching card identification information.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic diagram illustrating an IC card authentication system in accordance with an embodiment of the present invention.

FIG. 2 is a functional block diagram of MFP in accordance with the embodiment of the present invention.

FIG. 7 is an illustration of a user new registration window.

FIG. 8 is an illustration of a PIN code setting window in the user new registration process.

FIG. 9 is a diagram illustrating user authentication information stored in the user registration information DB.

DESCRIPTION OF THE PREFERRED EMBODIMENTS

Figure 3:
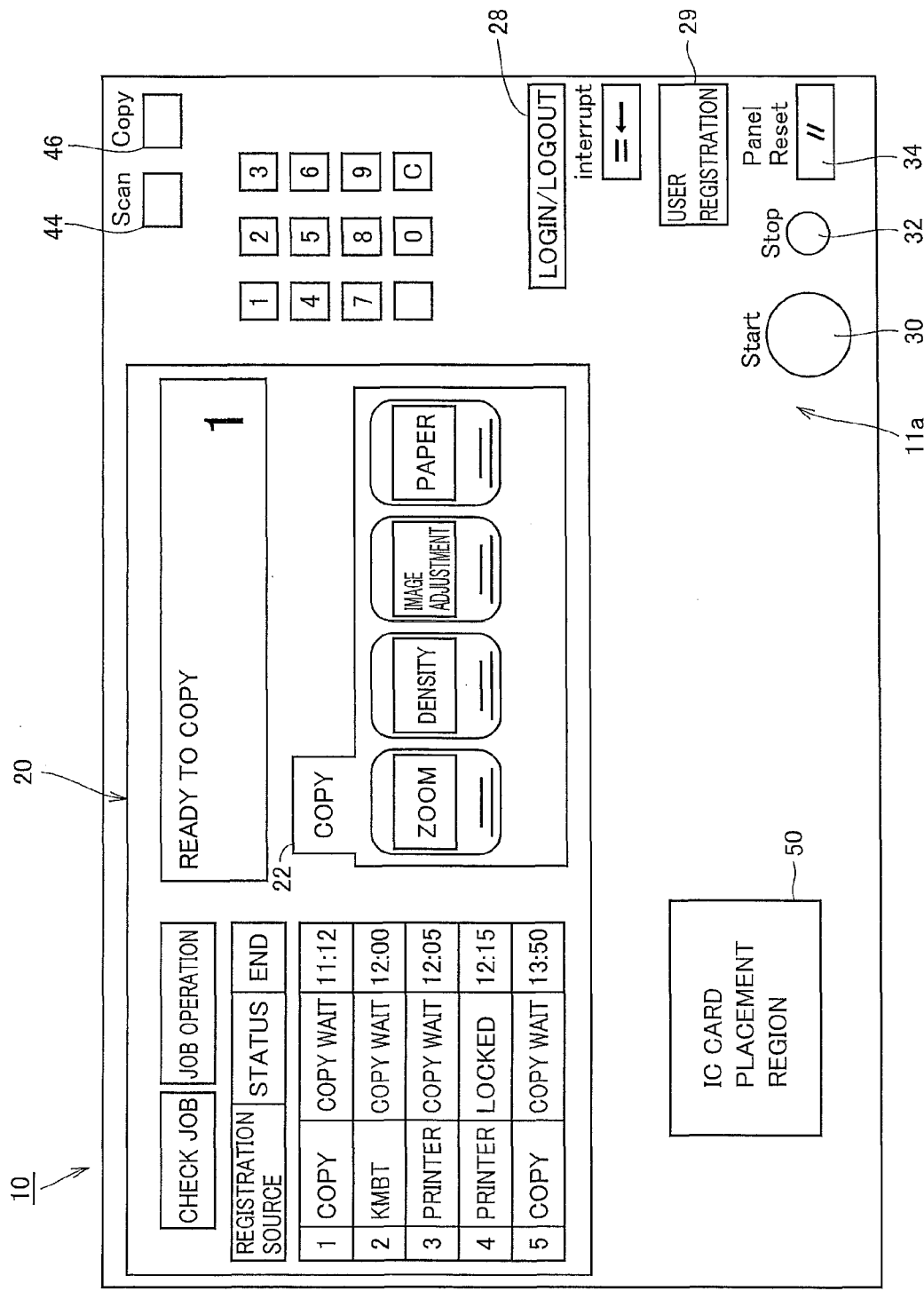
FIG. 3 is an illustration of a configuration of an operation panel of MFP in accordance with the embodiment of the present invention.

In the following, an embodiment of the present invention will be described with reference to the figures. In the following description, the same parts and components are denoted with the same characters. The designations and functions are also the same.

Using FIG. 1, an IC card authentication system in accordance with an embodiment of the present invention will be described.

Referring to FIG. 1, the IC card authentication system in accordance with the embodiment of the present invention includes an MFP (Multi Function Peripheral) 100 which is a kind of IC card authentication apparatus authenticating an IC card 150, and an administrator personal computer (PC) 200. It is noted that administrator PC 200 in this example also functions as an IC card issue apparatus issuing IC card 150.

MFP 100 includes a printing function, a copy function, a scanner function, and the like and additionally includes a user authentication function using IC card 150 issued by the IC card issue apparatus.

It is noted that although a multifunction device is shown as MFP 100 in the present embodiment, a printer with a single function may be employed.

Here, MFP 100 may be connected with administrator PC 200 via a network, such as LAN (Local Area Network) or WAN (Wide Area Network) using a public network or the like. Furthermore, communications through a network by administrator PC 200 and MFP 100 may be wired or wireless.

Using FIG. 2, a functional block of MFP 100 in accordance with the embodiment of the present invention will be described.

Referring to FIG. 2, MFP 100 in accordance with the embodiment of the present invention includes a scanner 112 scanning materials on paper medium and the like into electronic data, a ROM (Read Only Memory) 116 forming a storage portion, a RAM (Random Access Memory) 118, a printer 110 executing a print process, a network control portion 122 for executing data communications with an external terminal device connected through a network, an image processing portion 111 performing correction, processing, and edition on the input image data or performing correction, resolution conversion, and the like on the output image data to printer 110 and the like, a display 104, an operation input portion 106 provided with a touch panel, a ten-key pad, and the like, an IC card reader 108 for reading data stored in an IC card, an authentication processing unit 130 executing a user authentication process, a controller 102 controlling the entire MFP 100, and a user registration information database (DB) 113 storing user authentication information using HDD (Hard Disk Drive) or the like. It is noted that each portion is connected to controller 102 so that controller 102 can communicate data with each portion.

Network control portion 122 includes a reception portion 124 receiving data from an external terminal device and a transmission portion 126 transmitting data to an external terminal device.

It is noted that software programs for realizing a variety of functions of MFP 100 are stored in ROM 116, and controller 102 realizes prescribed functions by reading a variety of programs stored in ROM 116.

Authentication processing unit 130 includes a PIN code comparison portion 132 comparing PIN codes, an issue count comparison portion 134 comparing the number of times IC cards are issued, and a card ID comparison portion 136 comparing card identification information (card ID (identification)).

Furthermore, stored in user registration information DB 113 are card ID and an IC card issue count, a PIN code, etc. associated with the card ID, which are user authentication information used in the user authentication process, as described later. Here, other data may be stored as user authentication information in association with card ID.

Then, in the user authentication process in authentication processing unit 130, referring to the user authentication information stored in user registration information DB 113, the user authentication process is executed.

Using FIG. 3, a configuration of operation panel 10 in MFP 100 in accordance with the embodiment of the present invention will be described. It is noted that the operation panel has the functions of display 104 and operation input portion 106 in FIG. 2.

Referring to FIG. 3, a Start key 30 is used to start an operation such as copy/scan. A ten-key pad is used to input numeric values etc. such as the number of copies or PIN codes etc. A clear key is used to clear the input numeric values and discard the accumulated, stored image data.

A Stop key 32 is used to give an instruction to stop the copy/scan operation. A Panel Reset key 34 is used to discard the set mode and job.

In addition, an operation display 20 is provided with a touch panel for display, setting, and the like of a variety of modes.

The touch panel allows the user to make a variety of settings in accordance with the display contents in operation display 20. Furthermore, in a setting window region in the touch panel, buttons are usually arranged for basic/advanced settings performed in executing a copy operation or a scan operation. When each button is pressed, a layered window appears for performing the detailed settings.

In this example, a variety of detailed setting region 22 for executing a copy operation is shown, and an icon for adjusting magnifications, an icon for adjusting density, an icon for image adjustment, and an icon for setting paper are shown in this region, by way of example.

Although the icons for a variety of detailed settings in a case of copy operation are illustrated in this example, a similar detailed setting region is also displayed for a scan operation.

Furthermore, job information applied to MFP 100 at that moment is displayed in a job information window region on the left. The display is arranged in the order of jobs to be executed. When an operation such as deletion/change is performed on a particular job, a job operation button is selected and the job number button for the operation target is thereafter pressed. These operations allow a job operation window to appear, enabling an operation on the particular job.

A Copy key 46 and a Scan key 44 are select keys for setting in which of the copy mode and the scanner mode MFP 100 is to be operated.

When Copy key 46 is pressed, MFP 100 becomes available as a copier. In this state, a scanner operation cannot be executed.

On the other hand, when Scan key 44 is pressed, MFP 100 serves as a scanner. In this state, a copy operation cannot be executed.

It is noted that Copy key 46 and Scan key 44 cause exclusive operations. When one of them is selected, the other is automatically brought into a non-selected state.

Furthermore, operation panel 10 is provided with an IC card placement region 50. A user who wishes to use MFP 100 places his carrying IC card at this region, so that an IC card reader reads data to allow a prescribed user authentication process to be executed. Here, either contact-type or noncontact-type IC cards are applicable.

In addition, operation panel 10 is provided with a login/logout button 28. For example, when the user does not carry his IC card, the user can press this button to execute a prescribed user authentication process.

Furthermore, operation panel 10 is provided with a user registration button 29. By pressing this button, a user new registration process can be executed to store user authentication information for executing a user authentication process into the user registration information DB, as described later.

Using FIG. 4, a schematic configuration of administrator PC 200 in accordance with the embodiment of the present invention will be described.

Figures 4, 5:
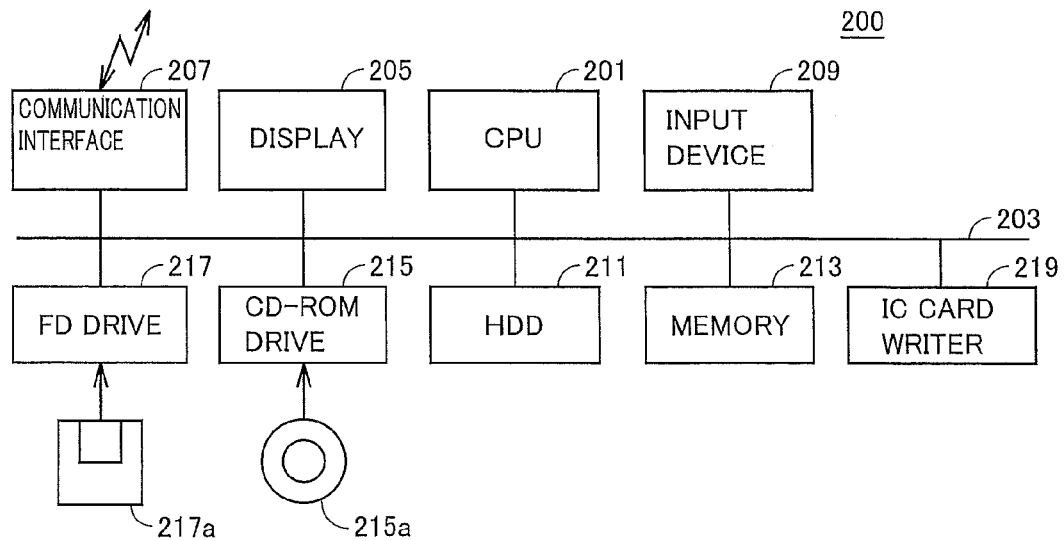
FIG. 4 is a block diagram illustrating a schematic configuration of an administrator personal computer in accordance with the embodiment of the present invention.
FIG. 5 is a diagram illustrating an exemplary data structure such as user authentication information of an IC card.

Referring to FIG. 4, PC 200 in accordance with the embodiment of the present invention includes a CPU (Central Processing Unit) 201 executing a variety of programs including OS (Operating System), a memory 213 temporarily storing data required to execute the program portion in CPU 201, an HDD (Hard Disk Drive) 211 storing a program executed in CPU 201 in a nonvolatile manner, and an IC card writer 219.

Furthermore, a software program for issuing an IC card in accordance with the embodiment of the present invention is stored in HDD 211. CPU 201 reads the software program so that administrator PC 200 functions as an IC card issue apparatus. Then, the administrator performs a prescribed operation on the IC card issue apparatus, so that user authentication information and the like for use in the user authentication process is stored in a raw IC card having no data stored therein, thereby issuing an IC card that can be used in the user authentication process in MFP 100. Here, in order to use the IC card in MFP 100, a user new registration process as described later has to be executed in advance. Such a software program is read from a flexible disk 217a, a CD-ROM 215a, etc. by an FD drive 217 or a CD-ROM (Compact Disc-Read Only Memory) drive 215, respectively. The software program for issuing IC cards is a well-known technique and the detail thereof will not be described here.

CPU 201 receives instructions from the user through an input device 209 formed of a keyboard, a mouse, or the like and outputs a window output generated by execution of a program to a display 205.

In addition, CPU 201 transmits data to an external device connected to LAN or WAN through a communication interface 207 formed of a LAN card or the like.

The above-noted portions communicate data with each other through an internal bus 203.

IC card writer 219 writes data in the IC card placed on the not-shown placement region. In this example, user authentication information and the like input by the administrator through input device 209 is written in the IC card by IC card writer 219. As described above, the IC card having the user authentication information stored therein is used in the user authentication process in MFP 100.

Using FIG. 5, an exemplary data structure of user authentication information of an IC card will be described.

Referring to FIG. 5, here, stored as user authentication information is data including card identification information of "card ID," "user name," "issue count," "company name," and "department," by way of example.

Specifically, by way of example, data including "12345678" for "card ID," "Yamada Taro" for "user name," "once" for "issue count," "ABC trading company" for "company name," and "accounts department" for "department" is stored. It is noted that in the user authentication process in this example, "card ID" and "issue count" data is used, and thus data may be formed only of "card ID" and "issue count." Alternatively, data other than the foregoing may be stored.

In the case where the issued card is, for example, lost and reissued, the data structure of the IC card is not changed except that the numeric value of "issue count" is incremented.

Using FIG. 6, the user new registration process of registering user authentication information in the user registration information DB in accordance with the embodiment of the present invention will be described.

Figure 6:
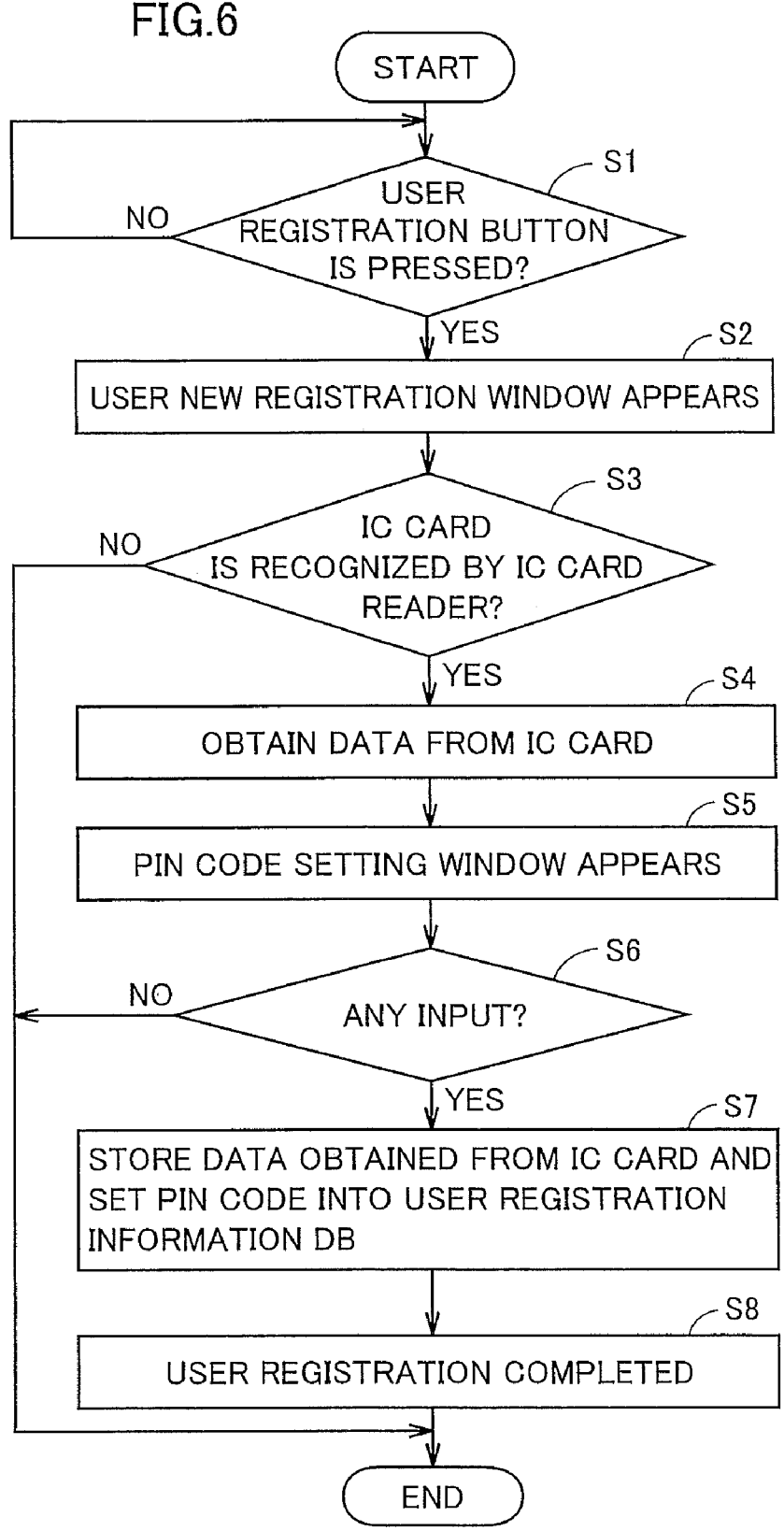
FIG. 6 is a flowchart illustrating a user new registration process of registering user authentication information in a user registration information DB in accordance with the embodiment of the present invention.

Referring to FIG. 6, first, it is determined whether the user registration button is pressed (step S1). Specifically, controller 102 determines whether or not user registration button 29 of operation panel 10 in FIG. 3 included in operation input portion 106 is pressed. As a result of pressing user registration button 29, the user new registration process is executed.

Then, if user registration button 29 is pressed, the process proceeds to the next step.

Then, a user new registration window appears (step S2).

Using FIG. 7, a user new registration window 300 will be described.

Referring to FIG. 7, here, in user new registration window 300, "Please place your IC card on the IC card placement region" is displayed to prompt the user to place the IC card issued by administrator PC 200 serving as the IC card issue apparatus on IC card placement region 50. Then, the display lets the user to place the IC card owned by himself on IC card placement region 50.

Referring to FIG. 6 again, next, it is determined whether or not the IC card is recognized by IC card reader 108 (step S3).

Specifically, if the IC card is placed on the above-noted IC card placement region 50, the IC card is brought into a recognizable state.

In step S3, if the IC card is recognized, then IC card reader 108 obtains the stored data from the recognized IC card (step S4).

Specifically, data such as user authentication information of the IC card as illustrated in FIG. 5 is obtained.

On the other hand, if the IC card cannot be recognized in step S3, the user new registration process ends (END). For example, if the IC card cannot be recognized even after a certain period of time has passed, the user new registration process ends.

Then, after step S4, a PIN code setting window appears (step S5).

Then, in the PIN code setting window, it is determined whether or not an input is made. If an input is made, the process proceeds to the next step S7. If no input is made, the user new registration process ends (END).

Using FIG. 8, a PIN code setting window 400 in the user new registration process will be described.

Referring to FIG. 8, in PIN setting window 400 in accordance with the embodiment of the present invention, a PIN code which the user wishes to use in the user authentication process will be set.

Specifically, an entry field 405 for entering a PIN code is provided.

The user enters the PIN code which the user wishes to set into PIN code entry field 405 using the ten-key pad, as described above.

Then, an "OK" button 415 is pressed so that the entered PIN code is set. It is assumed that, in this example, "1234" is input in PIN code entry field 405, by way of example. It is noted that symbols "*" are displayed as characters to be displayed in PIN code entry field 405, for the purpose of increasing confidentiality.

In the flowchart in FIG. 6, a PIN code is entered in entry field 405 and "OK" button 415 is pressed, so that it is determined that an input is made in step S6, and the process then proceeds to step S7. On the other hand, in step S6, for example, a "Cancel" button 420 is pressed in FIG. 8, so that it is determined that no input is made, and the user new registration process then ends.

Next, in step S7, the data obtained from the IC card and the set PIN code are stored in the user registration information DB (step S7).

Specifically, controller 102 associates the data such as user authentication information including the card ID stored in the IC card, which is obtained by IC card reader 108, and the set PIN code with each other for storage into user registration information DB 113.

Then, user registration is completed (step S8). Thus, the user authentication process using the IC card for which user registration is completed is allowed to be executed. Then, the user new registration process ends (END).

Using FIG. 9, the user authentication information stored in the user registration information DB will be described.

Referring to FIG. 9, here, a list of user authentication information in the user registration information DB is shown, in which data of IC cards and PIN codes associated with each other are stored.

Using FIG. 10, the user authentication process in authentication processing unit 130 in accordance with the embodiment of the present invention will be described.

Figure 10:
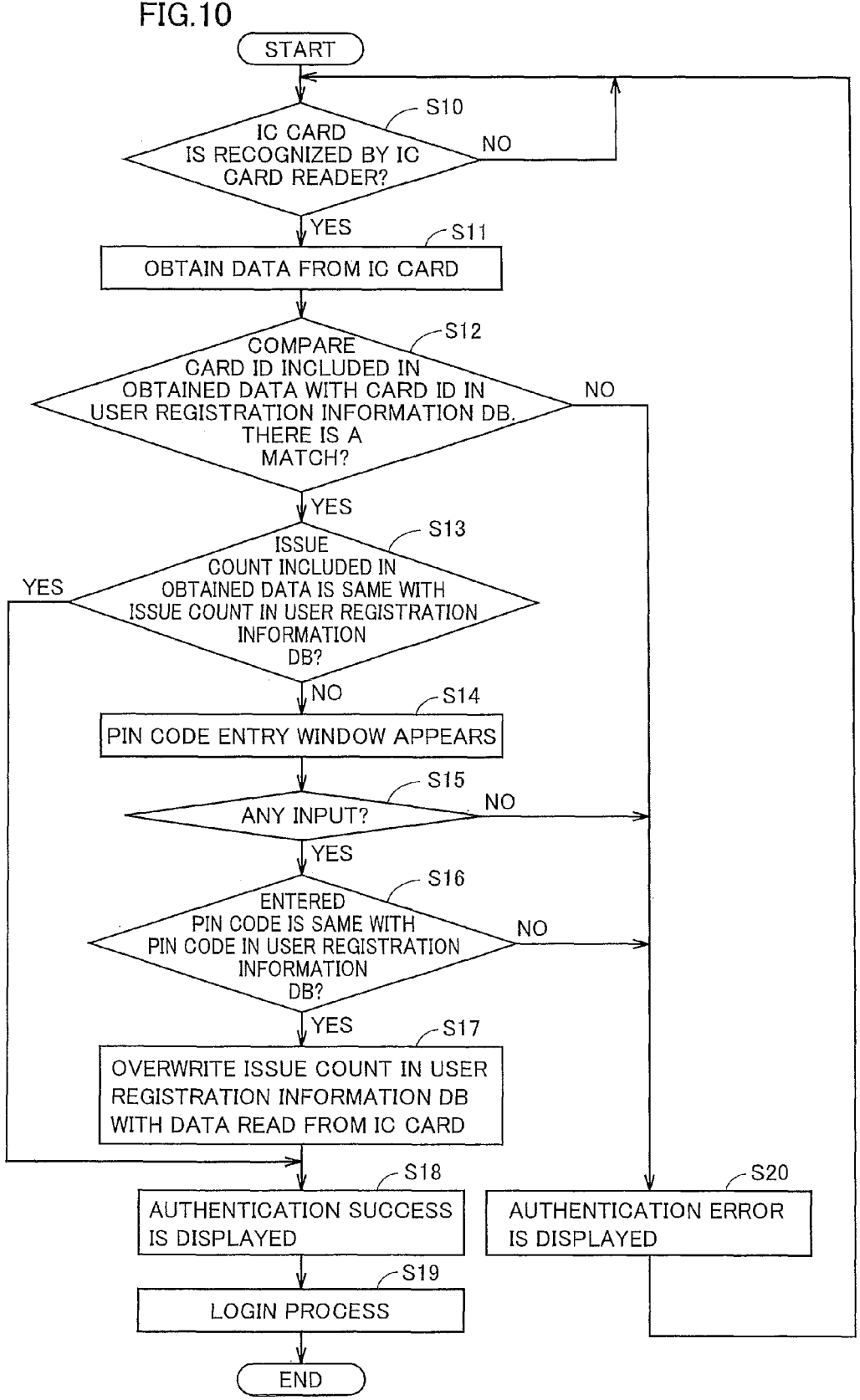
FIG. 10 is a flowchart illustrating a user authentication process in an authentication processing unit in accordance with the embodiment of the present invention.

Referring to FIG. 10, first, it is determined whether or not an IC card is recognized by IC card reader 108 (step S10). Specifically, when an IC card is placed on the above-noted IC card placement region 50, the IC card is brought into a recognizable state. If an IC card is recognized in step 10, the process proceeds to the next step.

If the IC card is recognized in step 10, then IC card reader 108 obtains data from the recognized IC card (step S11).

Then, the card ID included in the obtained data is compared with the card ID stored in user registration information DB 113, and it is determined whether or not the same ID is included (step S12).

Specifically, card ID comparison portion 136 of authentication processing unit 130 refers to user registration information DB 113 to determine whether or not the card ID identical to the card ID of the IC card obtained by IC card reader 108 exists.

If it is determined that the identical card ID does not exist, it is determined that the card ID included in the obtained data is the card ID for which user registration is not made in MFP 100. Then, an authentication error display appears on operation display 20 (step S20). Then, the process returns to step S1. Alternatively, the process may cause MFP 100 to execute the flow illustrated in FIG. 6 in order to execute a new user registration process.

On the other hand, if it is determined that the identical card ID for which user registration has been completed exists, it is determined that user registration of the card ID in MFP 100 has been completed. Then, the IC card issue count included in the obtained data is compared with the IC card issue count stored in user registration information DB 113, and it is determined whether or not the counts are identical (step S13).

Specifically, issue count comparison portion 134 of authentication processing unit 130 refers to user registration information DB 113 to determine whether or not the IC card issue count stored in association with the matched card ID is the same with the IC card issue count obtained by IC card reader 108.

Then, in step S13, the IC card issue count included in the obtained data is compared with the IC card issue count stored in user registration information DB 113, and if it is determined that the counts are identical, authentication success is displayed (step S18).

On the other hand, if in step S13, it is determined that the IC card issue count included in the obtained data and the IC card issue count stored in user registration information DB 113 are not identical as a result of comparison, then a PIN code entry window appears (step S14).

Then, in the PIN code entry window, it is determined whether or not an input is made (step S15).

If an input is made in the PIN code entry window in step S15, the process proceeds to the next step S16. If no input is made, an authentication error is displayed (step S20).

Using FIG. 11, a PIN code entry window 700 will be described.

Figure 11:
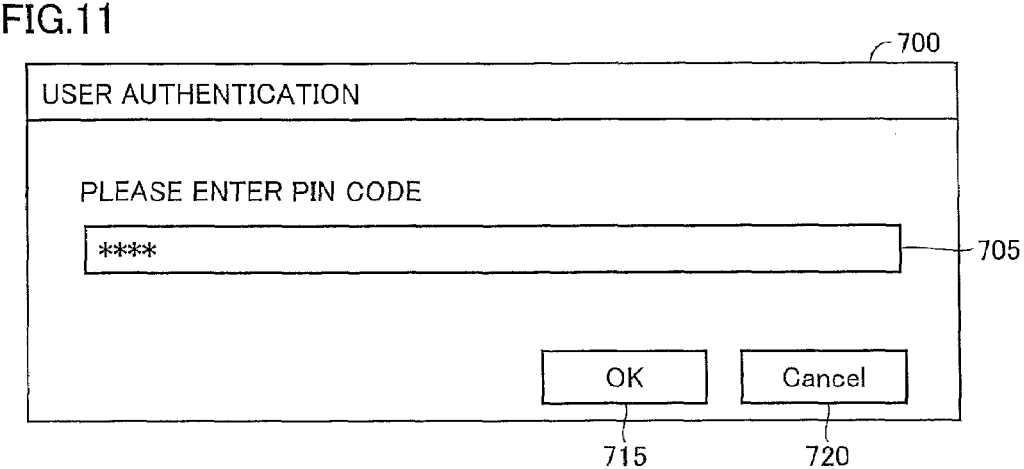
FIG. 11 is an illustration of a PIN code entry window.

Referring to FIG. 11, in entry window 700 in accordance with the embodiment of the present invention, a PIN code is entered when user authentication is executed.

Specifically, an entry field 705 is provided for entering a PIN code.

The user enters a PIN code preset by the user in PIN code entry field 705 using the ten-key pad as described above.

Then, an "OK" button 715 is pressed so that authentication of the entered PIN code is executed. It is noted that symbols "*" are displayed as characters to be displayed in PIN code entry field 705, for the purpose of increasing confidentiality.

Referring to the flowchart in FIG. 10 again, a PIN code is entered in entry field 705 and "OK" button 715 is pressed, so that it is determined that an input is made in step S15, and the process then proceeds to step S16. On the other hand, in step S15, for example, a "Cancel" button 720 in PIN code entry window 700 in FIG. 11 is pressed, so that it is determined that no input is made, resulting in authentication error display.

If it is determined that an input is made in step S15, then the entered PIN code is compared with the PIN code in the user registration information DB, and it is determined whether or not the PIN codes are identical (step S16).

Specifically, PIN code comparison portion 132 of authentication processing unit 130 refers to user registration information DB 113 to determine whether or not the PIN code of the IC card stored in association with the matched card ID and the entered PIN code are identical.

If it is determined that the PIN codes are identical in step S16, the issue count stored in the user registration information DB is overwritten with the issue count obtained from the IC card (step S17).

Then, authentication success is displayed (step S18). Then, a login process is performed (step S19). Then, the user authentication process ends (END). The success in authentication and execution of the login process enables, for example, operations of a copy function, a scanner function, or the like in MFP 100. Alternatively, it can be set that any other special function unique to the user becomes available.

In the scheme in accordance with the embodiment of the present invention, when an IC card is reissued, the card ID is matched but the data of the IC card issue count differs.

Therefore, if the IC card issue counts are different, that is, if it is determined that the IC card is the reissued one, the user is requested to enter a PIN code, thereby increasing the security level. Accordingly, without provision of an authentication server or the like for executing a user authentication process, the security level can be increased with a simple scheme.

Then, in the case where a PIN code is entered in response to the request for entry of PIN code, if the PIN code is matched, a login process is performed, and in addition, the IC card issue count in the user registration information DB is updated. Thus, when the reissued same IC card is used next time, the issue counts are the same and therefore entry of the PIN code is not required, thereby improving the user's convenience.

Furthermore, when the IC card issue count in the user registration information DB is updated and, for example, if the IC card with the former, old issue count is used by other persons, entry of the PIN code is asked for, for the issue counts are different. Therefore, even if the former, old IC card may possibly be used by other persons, entry of the PIN code is asked for, as long as the issue count is updated. The security level can thus be increased.

Here, in step S8, when the issue count information in the user registration information DB is overwritten with the issue count read from the IC card, desirably, the issue count is overwritten (changed) if the issue count read from the IC card is greater than the issue count stored in the user registration information DB.

In the present example, IC card placement region 50 for recognizing IC cards is provided in operation panel 10. However, the region may be provided at another place without being limited to the operation panel. In the case of a noncontact-type IC card, the region may not be provided, and, for example, the user comes close to MFP 100 so that radio waves are transmitted from the IC card to the IC card reader and data in the IC card is recognized in the IC card reader.

Furthermore, in the foregoing description, a PIN code is not stored in user authentication information as a data structure of an IC card. However, when an IC card is issued using administrator PC 200 serving as an IC card issue apparatus, data of the PIN code desired by the user may be included. In this case, in the user new registration process illustrated in FIG. 6, without performing the process in steps S5, S6 for setting a PIN code, when user authentication information including data of a PIN code is obtained from an IC card, the data may be stored in the user registration information DB. In this regard, when data of a PIN code is included in an IC card, in step S16 in FIG. 10, the entered PIN code may be compared with the PIN code stored in the IC card, rather than being compared with the PIN code stored in the user registration information DB. In this case, the PIN code may not be stored in the user registration information DB in association with the card ID.

In the foregoing description, in the scheme to allow the user authentication information stored in the issued IC card to be stored in the user registration information DB of MFP 100, data is obtained using the IC card reader and then stored in the user registration information DB. However, the present invention is not limited thereto. The user may directly input user authentication information for storage using the touch panel, the ten-key pad, or the like of operation panel 10. Alternatively, data of user authentication information may be transmitted to MFP 100 from administrator PC 200 connected via a network and the received user authentication information may be stored in the user registration information DB.

Furthermore, in the foregoing description, when the IC card issue counts are different, that is, when it is determined that the IC card is the reissued one, the user is requested to enter a PIN code, thereby increasing the security level. However, in place of a PIN code, the user may be requested to input one of data such as "user name," "company name," and "department" or the combination thereof, so that the user authentication process is executed in accordance with the similar scheme.

In this example, it has been described that user registration button 29 is provided on operation panel 10 and if the button is pressed, the user new registration process is executed. However, user registration button 29 is not always necessary. An icon for executing the user new registration process may appear in the form of touch panel, or, for example, an icon for executing the user new registration process may appear when login/logout button 28 is pressed.

It is noted that the IC card authentication apparatus in accordance with the present invention is not limited to MFP and may be a printer, a facsimile machine, or the like. For a controller controlling the IC card authentication apparatus, a program may be provided which allows a computer to function to execute the control as described in the above-noted flows. Such a program may be recorded in a computer readable recording medium such as a flexible disk, a CD-ROM (Compact Disk-Read Only Memory), a ROM (Read Only Memory), a RAM (Random Access Memory), and a memory card, which accompanies a computer, and be provided as a program product. Alternatively, the program may be recorded in a recording medium such as a hard disk contained in a computer. Alternatively, the program may be downloaded via a network.

The program in accordance with the present invention may allow the process to be executed by invoking necessary modules, among program modules provided as a part of Operation System (OS) of a computer, in a prescribed sequence at a prescribed timing. In this case, the aforementioned modules are not included in the program itself and the process is executed in cooperation with OS. The program that does not include such modules may also be included in the program in accordance with the present invention.

Furthermore, the program in accordance with the present invention may be built in a part of another program. In this case, the modules included in another program are not included in the program itself, and the process is executed in cooperation with another program. Such a program built in another program may also be included in the program in accordance with the present invention.

The program product to be provided is installed in a program storage portion such as a hard disk for execution. It is noted that the program product includes the program itself and a recording medium having the program recorded thereon.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An IC card authentication apparatus comprising:
   an IC card reader for reading information of an IC card having card identification information and an IC card issue count stored therein;
   a memory for storing user information including card identification information and a personal identification number and an IC card issue count associated with said card identification information; and
   a processing unit for executing a user authentication process,
   said processing unit including
      an user identification comparison portion for comparing the card identification information stored in the IC card read by said IC card reader with the card identification information of the user information stored in said memory,
      a card issue count comparison portion for, if said card identification information matches in said user identification comparison portion, comparing the IC card issue count stored in said IC card with the IC card issue count of said user information stored in said memory and having the matching card identification information, and
      a personal identification number comparison portion for, in response to a determination by the card issue count comparison portion that the IC card issue counts do not match, comparing a personal identification number input by a user with the personal identification number of said user information stored in said memory and having the matching card identification information.

2. The IC card authentication apparatus according to claim 1, further comprising a display for displaying an entry window for a user to enter said personal identification number, if said IC card issue counts indicate unmatch.

3. The IC card authentication apparatus according to claim 1, further comprising updating portion for updating the IC card issue count stored in said memory, if said IC card issue counts indicate unmatch and if there is a match in personal identification number comparison in said personal identification number comparison portion.

4. The IC card authentication apparatus according to claim 3, wherein said updating portion updates the IC card issue count stored in said memory with the IC card issue count stored in the IC card.

5. The IC card authentication apparatus according to claim 3, wherein said updating portion updates if the IC card issue count stored in the IC card is greater than the IC card issue count stored in said memory.

6. The IC card authentication apparatus according to claim 1, wherein the user is authenticated when the card issue count comparison portion determines that the IC card issue counts match.

7. The IC card authentication apparatus according to claim 1, wherein the user is authenticated when the personal identification number comparison portion determines that the personal identifications match.

8. An IC card authentication method comprising the steps of:
   storing user information including card identification information and a personal identification number and an IC card issue count associated with said card identification information into memory;
   reading information of an IC card having card identification information and an IC card issue count stored therein; and
   executing a user authentication process,
   said step of executing a user authentication process including the steps of
      comparing the card identification information stored in the IC card with the card identification information of the user information stored in said memory,
      if said card identification information matches, comparing the IC card issue count stored in said IC card with the IC card issue count of said user information stored in said memory and having the matching card identification information, and
      in response to a result of the comparing of the IC card issue counts indicating that the IC card issue counts indicate unmatch, comparing a personal identification number input by a user with the personal identification number of said user information stored in said memory and having the matching card identification information.

9. A non-transitory recording medium having an IC card authentication program stored thereon to be executed by a computer including memory for storing user information including card identification information and a personal identification number and an IC card issue count associated with said card identification number, said IC card authentication program causing the computer to execute processing including the steps of:
   reading information of an IC card having card identification information and an IC card issue count stored therein; and
   executing a user authentication process,
   said step of executing a user authentication process including the steps of
   comparing the card identification information stored in the IC card with the card identification information of the user information stored in said memory,
      if said card identification information matches, comparing the IC card issue count stored in said IC card with the IC card issue count of said user information stored in said memory and having the matching card identification information, and
   in response to a result of the comparing of the IC card issue counts indicating that the IC card issue counts indicate unmatch, comparing a personal identification number input by a user with the personal identification number of said user information stored in said memory and having the matching card identification information.

* * * * *